(12) United States Patent
Aguilar

(10) Patent No.: US 8,925,296 B2
(45) Date of Patent: Jan. 6, 2015

(54) JET ENGINE, IN PARTICULAR A JET ENGINE FOR AN AIRCRAFT

(76) Inventor: Michel Aguilar, Castanet Tolosan (FR)

(*) Notice: Subject to any disclaimer, the term of this patent is extended or adjusted under 35 U.S.C. 154(b) by 847 days.

(21) Appl. No.: 13/142,673

(22) PCT Filed: Jan. 15, 2010

(86) PCT No.: PCT/EP2010/000195
§ 371 (c)(1),
(2), (4) Date: Jun. 29, 2011

(87) PCT Pub. No.: WO2010/086091
PCT Pub. Date: Aug. 5, 2010

(65) Prior Publication Data
US 2012/0017563 A1 Jan. 26, 2012

(30) Foreign Application Priority Data

Jan. 27, 2009 (FR) ...................................... 09 00330
Aug. 12, 2009 (FR) ...................................... 09 03942

(51) Int. Cl.
F02C 5/12 (2006.01)
F01D 17/14 (2006.01)
F02K 9/40 (2006.01)
F02K 7/067 (2006.01)

(52) U.S. Cl.
CPC . *F01D 17/14* (2013.01); *F02C 5/12* (2013.01); *F02K 9/40* (2013.01); *F02K 7/067* (2013.01)
USPC ............ 60/247; 60/39.38; 60/39.8; 60/39.39; 60/39.76; 60/39.78

(58) Field of Classification Search
USPC ................. 60/247, 39.38, 39.39, 39.4, 39.76, 60/39.77, 39.78, 39.79, 39.8
See application file for complete search history.

(56) References Cited

U.S. PATENT DOCUMENTS

| | | | | |
|---|---|---|---|---|
| 2,623,355 A | * | 12/1952 | Boulet | .......................... 60/39.38 |
| 2004/0154306 A1 | * | 8/2004 | Benians | .......................... 60/776 |
| 2008/0011073 A1 | * | 1/2008 | Pilatis et al. | .................. 73/118.1 |
| 2008/0098710 A1 | * | 5/2008 | Janssen et al. | ............... 60/39.38 |

FOREIGN PATENT DOCUMENTS

| | | |
|---|---|---|
| DE | 548 631 C | 4/1932 |
| DE | 947 655 C | 8/1956 |
| FR | 2 562 199 A1 | 10/1985 |
| WO | 89/12741 A1 | 12/1989 |

* cited by examiner

*Primary Examiner* — Phutthiwat Wongwian
*Assistant Examiner* — Steven Sutherland
(74) *Attorney, Agent, or Firm* — Defillo & Associates, Inc.; Evelyn A. Defillo

(57) ABSTRACT

The invention relates to a jet engine (1), in particular an aircraft jet engine, including at least one combustion chamber (3). The combustion chamber (3) is connected to at least one compressed gas intake (4) and to at least one burnt gas outlet (5). Said burnt gas outlet(s) (5) include an exhaust valve. The exhaust valve includes two rotary parts (7), referred to as rotary exhaust parts, the rotary exhaust parts (7) including curved walls (8) and intermediate walls (9) connecting the curved walls (8), and rotating in a coordinated, continuous fashion such that said valve is in a closed position in order to block the gas during at least one combustion step, and in an open position in order to define a space (10) through which the gas flows out from the combustion chamber (3) during at least one expansion step.

16 Claims, 4 Drawing Sheets

JET ENGINE, IN PARTICULAR A JET ENGINE FOR AN AIRCRAFT

This application is a national stage entry of PCT/EP2010/000195 filed Jan. 15, 2010, under the International Convention claiming priority over French Patent Application No. 0900330 filed Jan. 27, 2009 and French Patent Application No. 0903942 filed Aug. 12, 2009.

FIELD OF THE INVENTION

The invention relates to a jet engine, in particular a jet engine for an aircraft.

BACKGROUND OF THE INVENTION

Jet engines which are currently used in the aeronautical industry and are commonly called turbine engines operate using a so-called Joule-Brayton thermodynamic cycle by constant-pressure combustion of a mixture of compressed air and fuel. The gases issuing from this combustion are then discharged at high velocity into the atmosphere through a nozzle, thus producing a propulsive force.

A considerable amount of R&D effort has been directed towards these turbine engines for the last sixty years and they have reached a mature stage of development. There is today little potential for improving them. Now, faced with environmental pressures and the rising price of fuel, the aeronautical industry must find new technological solutions to improve the performance of jet engines.

The use of jet engines which operate using a so-called Humphrey thermodynamic cycle seems to be a promising way ahead. In contrast with traditional turbine engines, the combustion takes place at a constant volume and no longer at a constant pressure. The theoretical potential of such jet engines has been known for a very long time but their practical application comes up against technological difficulties.

The best known constant-volume combustion jet engine is the wave rotor. The wave rotor operates according to the principle of a barrel. It consists of multiple enclosures arranged around the axis of a cylinder. The cylinder rotates between two fixed ends called end plates. Each of its ends comprises ports which control the flow of the gases, in particular to the compressor and the turbine. When the cylinder rotates, the enclosures are thus connected cyclically to the compressor and to the turbine.

In a first phase of the cycle, the enclosure is connected solely to the compressor. The enclosure then fills up with compressed gas and fuel.

This phase is followed by a phase during which the enclosure is closed, countering the circulation of the gases to the compressor or the turbine. Combustion is then performed in the enclosure. This combustion therefore takes place at a constant volume.

Lastly, the enclosure is connected to the turbine. The gases issuing from the combustion are then discharged towards the turbine.

In this type of jet engine, there is a considerable leakage of gases between the fixed ends and the cylinder, which considerably reduces the performance of such systems.

In order to reduce these losses, constant-volume jet engines exist using the Humphrey cycle in which the volume of the combustion chamber is maintained constant by valves.

The document FR2829528 describes such a jet engine which comprises multiple combustion chambers which are closed periodically by butterfly valves. The valves partially reduce the leakage of gases but, owing to the alternating closing and opening cycles, they are subjected to repeated impacts which, under the conditions of high temperatures in the order of 2000° C., entail rapid wear.

More generally, in the current constant-volume combustion jet engines there is a high risk of wear on the surfaces subjected to fluctuations in pressure and temperature.

Moreover, in addition to the poorer performance caused by the leaks of gas, there is also a loss of efficiency due to the many areas of highly turbulent flow.

SUMMARY OF THE INVENTION

The object of the invention is to provide a jet engine which does not have the abovementioned disadvantages of the prior art.

The object of the invention is in particular to provide a jet engine which has a high performance and is adapted so as to operate under conditions of large fluctuations in pressure and high temperature.

In order to achieve this, the invention relates to a jet engine, in particular an aircraft jet engine, comprising at least one enclosure, termed a combustion chamber, adapted so as to carry out a combustion therein in at least one so-called combustion step and connected to at least one gas intake, termed the compressed gas intake, which makes it possible to supply the combustion chamber with compressed gas in at least one so-called filling step, and to at least one outlet, termed the burnt gas outlet, through which the gases are discharged from the combustion chamber in at least one so-called expansion step, said burnt gas outlet(s) comprising a valve, termed a discharge valve.

According to the invention, the discharge valve comprises two rotary parts, termed rotary discharge parts, the rotary discharge parts comprising curved walls and intermediate walls connecting the curved walls and rotating in a coordinated and continuous fashion so as to be:

in an angular position, termed the closed position, in which a curved wall of a rotary discharge part is substantially in contact with a curved wall of the other part, so as to counter a significant discharge of gases from the combustion chamber, in at least one combustion step, and in an angular position, termed the open position, in which one of the intermediate walls of a rotary discharge part is situated facing a wall of the other rotary discharge part so as to define an open space between the two walls and through which the gases are discharged from the combustion chamber in at least one expansion step.

The combustion chamber is closed by the discharge valve during the combustion step. The combustion is thus performed at a constant volume using the Humphrey cycle and greater energy efficiency is achieved than in conventional turbine engines.

Moreover, the closing of the combustion chamber by the rotary discharge parts ensures that gas leaks are prevented when said parts are in the closed position.

The rotating movement of the rotary parts is fluid and gradual, which eliminates the impacts and/or the large fluctuations in pressure, in particular between the combustion and expansion steps and consequently prevents premature wear of the jet engine.

The operation of the rotary discharge parts also allows the turbulence phenomena to be controlled better.

Advantageously and according to the invention, in the open position, one of the intermediate walls of a rotary discharge part is situated facing one of the intermediate walls of the other rotary discharge part.

Furthermore, according to the invention, the rotary discharge parts advantageously rotate directly with respect to the discharge direction of the gases from the combustion chamber so as to assist the movement of the gases when they are discharged and to reduce the turbulence phenomena.

It should, however, be noted that the discharge parts can also be arranged so as to rotate in a contrary direction with respect to the discharge direction of the gases from the combustion chamber. However, this arrangement requires the addition of so-called secondary nozzles positioned symmetrically relative to the main nozzle through which the gases from the combustion chamber are discharged. This arrangement offers the advantage of better filling with cool gases and more complete discharge of the burnt gases, as well as a marked reduction in the mechanical power required for the rotation of the discharge parts.

Moreover, advantageously according to the invention, the rotary parts are symmetrical relative to the axis of the combustion chamber.

Furthermore, advantageously and according to the invention, the curved walls of one rotary part have the same radius of curvature as the curved walls of the other rotary part.

In the closed position, the rotary parts thus roll on each other, without any impact.

Furthermore, advantageously and according to the invention, the intermediate walls of the rotary parts are convex.

The open space through which the gases are discharged from the combustion chamber will thus have a shape which is close to that of the injector tube of a nozzle so as to obtain an optimal gas discharge velocity.

Preferably, advantageously and according to the invention, the compressed gas intake comprises a valve, termed the injection valve, which is adapted so as to counter the flow of the gases between the compressed gas intake and the combustion chamber in at least one combustion step.

Furthermore, advantageously and according to the invention, the injection valve comprises two rotary parts, termed rotary injection parts, with a structure similar to the rotary discharge parts, and rotating in a coordinated fashion so as to be in an angular position, termed the closed position, in which a curved wall of a rotary injection part is substantially in contact with a curved wall of the other part, so as to counter a significant flow of the gases between the compressed gas intake and the combustion chamber, in at least one combustion step, and In an angular position, termed the open position, in which one intermediate wall of a rotary injection part is situated facing an intermediate wall of the other rotary injection part so as to define a space through which the compressed gases supply the combustion chamber, in at least one filling step.

Advantageously and according to the invention, the rotary discharge and injection parts are adapted so as to be in the fixed open position during several successive combustion/expansion steps and then rotate in a coordinated and continuous fashion so as to alternate several successive combustion/expansion cycles during which they are in the closed position in the combustion phase and then in the open position in the expansion phase.

When the discharge and injection valves are in the fixed open position, the jet engine operates as a conventional constant-pressure combustion turbine engine. This mode of operation is continuous, in contrast with constant-volume combustion which is pulsed.

During some phases of a flight, a continuous mode of operation is sometimes preferable. This is the case in particular in take-off and landing phases.

The jet engine according to the invention can allow continuous operation at a constant pressure during take-off, followed by pulsed operation at a constant volume when cruising.

Also, advantageously and according to the invention, the rotary injection and discharge parts are adapted so as to rotate in a coordinated and continuous fashion so as to alternate several successive combustion/expansion cycles during which they are in the closed position in the combustion phase and then in the open position in the expansion phase, and then be in the fixed open position during several successive combustion/expansion steps.

As above, the jet engine according to the invention allows pulsed operation at a constant volume during the cruising phase, followed by continuous operation at a constant pressure during landing.

Advantageously and according to the invention, each combustion chamber comprises at least one fuel supply and at least one ignition means adapted so as to ignite a mixture of fuel and compressed gases.

Preferably, advantageously and according to the invention, the jet engine comprises multiple ignition means, each situated at different distances from the compressed gas intake, said ignition means being actuated in a delayed manner.

Thus, for a combustion chamber comprising two ignition means situated at extreme positions of this chamber, the ignition means situated at one end can be actuated at a given time, and then the ignition means situated at the other end can be actuated in a delayed manner.

When the burnt gases issuing from the first combustion expand, they compress the unburned gases, termed cool gases, and increase their pressure beyond the initial injection pressure caused just by the initial compression of the compressed gases. Once a specified pressure of the cool gases has been reached, a second ignition is triggered. The final pressure of the burnt gases will thus be greater than that reached by burnt gases issuing from compressed cool gases which have been ignited only once.

Moreover, this configuration makes it possible to approach a pressure of the cool gases which is sufficient for them to ignite spontaneously in accordance with the detonation phenomenon.

Advantageously and according to the invention, the rotary discharge parts are situated in chambers, each chamber having at least one opening allowing the circulation of gas between the outside of said chamber and the burnt gas outlet when the rotary discharge parts are in the closed position.

When the discharge valves close, by inertia, the pressure of the burnt gases at the burnt gas outlet becomes lower than the external atmospheric pressure, thus creating a negative thrust. To obviate this phenomenon, an opening connects the outside and the burnt gas outlet, thus re-establishing the equilibrium pressure.

Advantageously and according to the invention, the rotary discharge parts comprise a passage which traverses them from one side to the other and is adapted so as to permit fluid to circulate through said parts.

The circulation of fluid through the parts cools them.

Furthermore, advantageously and according to the invention, the fluid circulating through the rotary discharge parts is compressed gas which comes from the compressed gas intake.

The compressed gas supplying the combustion chamber is then preheated by the heat of the rotary discharge parts.

Advantageously and according to the invention, some of the thermal energy emitted by the gases issuing from the burnt gas outlet is used to heat the compressed gases upstream of the combustion chamber.

BRIEF DESCRIPTION OF THE DRAWINGS

Other objects, features and advantages of the invention will become apparent on reading the following description which refers to the attached figures showing preferred embodiments of the invention, given purely by way of non-limiting example and in which.

DETAILED DESCRIPTION OF A PREFERRED EMBODIMENT OF THE INVENTION

Figure 1:
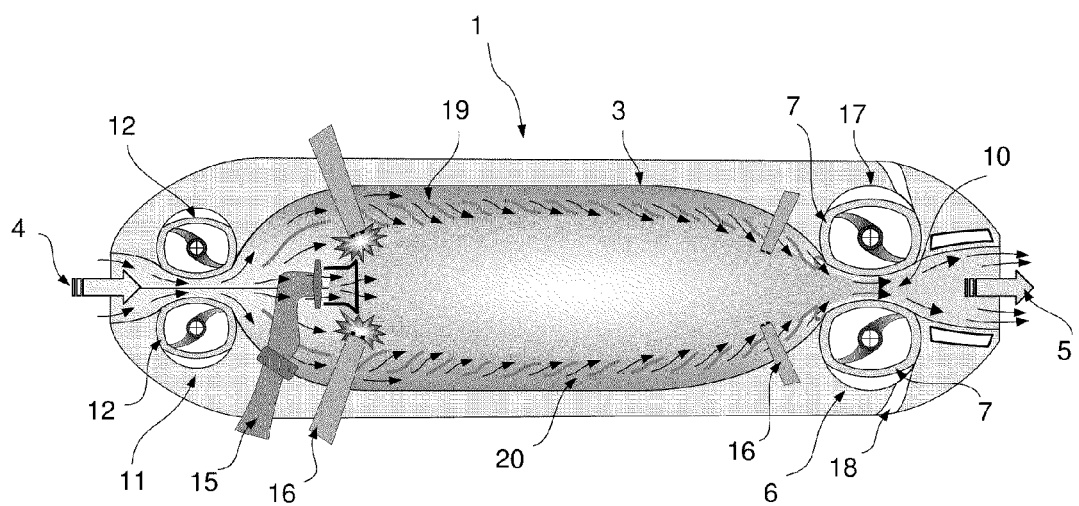
FIG. 1 is a view in section of an embodiment of the jet engine.

FIGS. 1 to 5 show a jet engine 1 according to the invention comprising a combustion chamber 3.

The combustion chamber 3 is supplied with compressed air through a compressed gas intake 4.

The compressed gas is generated by a compressor.

The compressed gas is preferably compressed air at a pressure between 2 and 4 bar.

The combustion chamber 3 is adapted to perform combustion therein.

To achieve this, it comprises at least one fuel supply 15 and at least one ignition means 16 to ignite a mixture of fuel and compressed gases.

In a preferred embodiment of the invention, and as shown in FIGS. 1 to 5, the combustion chamber 3 comprises multiple ignition means 16, each situated at different distances from the compressed gas intake 4. The ignition means 16 can preferably and conventionally be a controlled electrical ignition.

The combustion chamber 3 can also comprise a flame tube 19, the purpose of which is to maintain the burnt gases at a very high temperature, not in contact with the walls of the combustion chamber 3.

The combustion chamber 3 can also comprise dilution and crimping orifices 20 so as to direct some of the compressed air, known as "primary air", between the hot gases and the walls of the combustion chamber 3, and hence to keep the hot gases out of contact with the walls.

The combustion chamber 3 is connected to a burnt gas outlet 5 through which the gases can be discharged from the combustion chamber. This outlet 5 is equipped with a discharge valve 6.

The discharge valve 6 consists of two rotary discharge parts 7, which are preferably symmetrical relative to the axis of the combustion chamber 3.

The rotary discharge parts 7 comprise substantially curved walls 8 and intermediate walls 9 connecting the curved walls 8.

As shown in FIGS. 1 to 6, the rotary discharge parts 7 preferably comprise two curved walls 8 and two intermediate walls 9.

Figure 6:
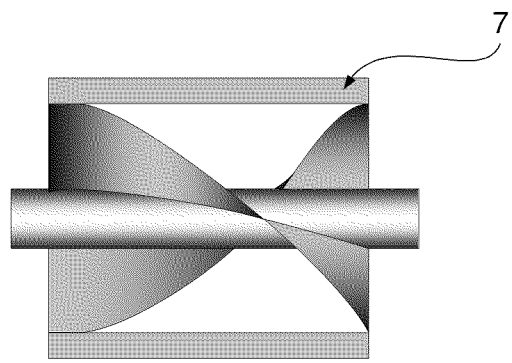
FIG. 6 is a perspective view of a rotary part.

FIG. 6 illustrates a rotary part. In a preferred embodiment of the invention, the rotary part is moulded on a cylinder. The curved walls 8 follow the geometry of this cylinder and consequently have the same radius of curvature. The intermediate walls 9 are convex and have a radius of curvature greater than the radius of the initial cylinder.

Figure 7:
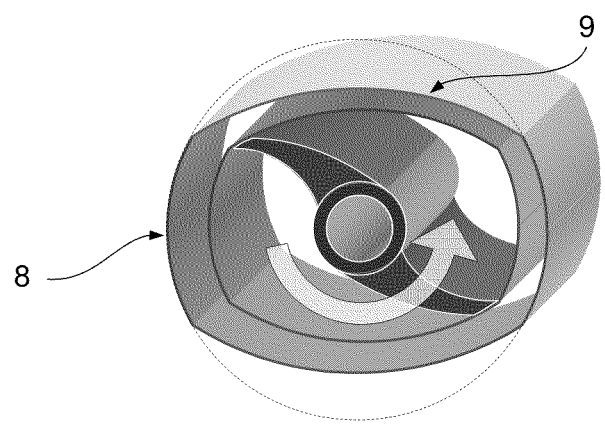
FIG. 7 is a view in section of a rotary part.

As illustrated in FIGS. 6 and 7, the rotary parts comprise a passage which traverses them from one side to the other and is adapted so as to allow the circulation of fluid, in particular a cooling fluid, through said parts.

As illustrated in FIG. 7, according to a preferred embodiment of the invention, the passage is helical in shape, the axis of the helicoids being the axis of rotation of the parts so as to accelerate the circulation of the cooling fluid through the rotary part.

Preferably, as shown in FIGS. 1 to 5, the compressed gas intake 4 comprises an injection valve 11.

Preferably, as shown in FIGS. 1 to 5, the injection valve 11 has a similar structure to that of the discharge valve 6, in other words it consists of two rotary parts, termed rotary injection parts 12, these rotary injection parts 12 themselves having a similar structure to that of the rotary discharge parts 7. Indeed, they comprise curved walls and intermediate walls connecting the curved walls.

According to a preferred embodiment of the invention and as shown in FIGS. 1 to 5, these rotary injection parts 12 are symmetrical relative to the axis of the combustion chamber 3 and comprise two curved walls and two convex intermediate walls which have a radius of curvature greater than that of the curved walls.

However, even if the rotary injection 12 and discharge 7 parts have similar structures, they can have different dimensions and/or a different rotating movement.

As shown in FIGS. 1 to 5, the rotary discharge 7 and injection 12 parts are preferably situated in chambers 17.

An opening 18 is formed in the chambers 17 of the rotary discharge parts 7. This opening 18 connects the outside to the inside of the chamber 17.

Figure 2:
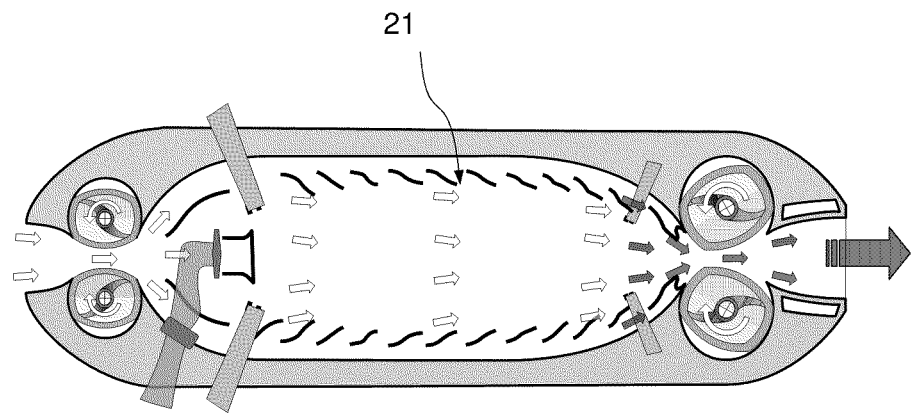
FIG. 2 is a view in section of an embodiment of the jet engine in the filling step.

FIG. 2 shows the jet engine 1 during the filling step. In this step, the combustion chamber 3 is supplied with compressed gas.

To do this, the injection valve 11 is in the open position.

As shown in FIG. 2, the rotary injection parts 12 are then in an angular position, termed the open position, in which an intermediate wall 14 of a rotary injection part is situated facing an intermediate wall 14 of a wall of the other rotary injection part so as to define a space through which the compressed gases supply the combustion chamber 3 in at least one filling step.

The discharge valve 6 is also in the open position.

As shown in FIG. 2, the rotary discharge parts 7 are then in an angular position in which one of the intermediate walls 9 of a rotary discharge part 7 is situated facing an intermediate wall of a wall of the other rotary discharge part 7 so as to define an open space 10 between the two walls and through which the gases are discharged from the combustion chamber 3.

The combustion chamber 3 thus fills up with compressed cool gases 21, in this case compressed air, which expel the gases remaining in the combustion chamber 3.

The rotary discharge parts 7 rotate about their central axis. This movement preferably takes place in the discharge direction of the gases from the combustion chamber 3 so as to reduce the turbulence phenomena.

The rotary discharge parts 7 which were in an open position in which two of their intermediate walls 9 were facing each other during the filling step, as illustrated in FIG. 2, are then rotated.

This rotation takes place in a coordinated and continuous fashion such that a curved wall 8 of a rotary discharge part 7 comes into contact with a curved wall 8 of the other part.

Figure 3:
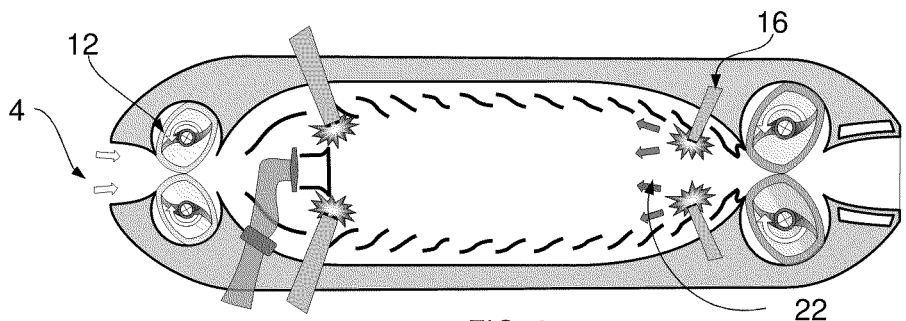
FIG. 3 is a view in section of an embodiment of the jet engine at the beginning of the combustion step.
Figure 4:
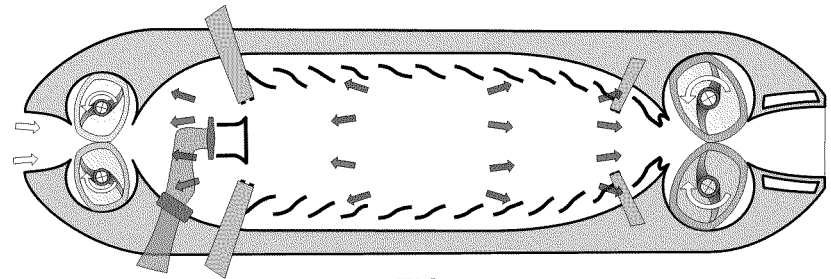
FIG. 4 is a view in section of an embodiment of the jet engine at the end of the combustion step.

Thus, by virtue of their contact, the curved walls 8 counter the discharge of gases from the combustion chamber 3. The rotary discharge parts 7 are then in a closed position, as shown in FIGS. 3 and 4.

There is preferably a minimum clearance between the two curved walls 8 so as to prevent the risks of impact and wear on these walls.

However, the clearance is defined so as to counter a significant flow of the gases through the burnt gas outlet 5, in particular by virtue of the phenomenon of aerodynamic blocking.

Figure 8:
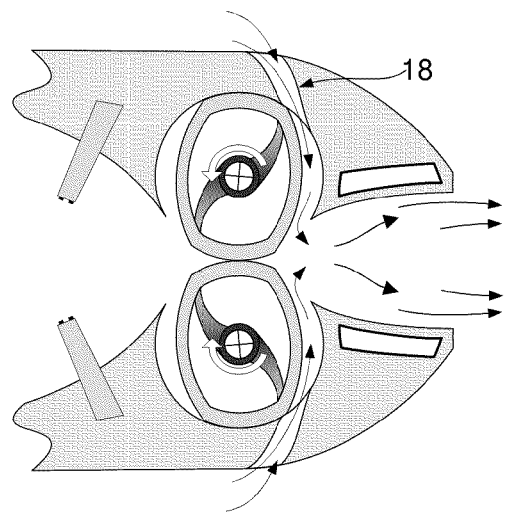
FIG. 8 is a partial view in section of the jet engine at the burnt gas outlet.

When the discharge valves close, by inertia, the pressure of the burnt gases in the space 10 falls below the external atmospheric pressure, thus creating a negative thrust. To obviate this phenomenon, the opening 18 connects the outside and the burnt gas outlet at the beginning of the combustion phase shown in FIG. 8. Because of this opening 18, the equilibrium pressure is re-established.

In the same way as the rotary discharge parts 7, the rotary injection parts 12 which were in an open position in which two of their intermediate walls were facing each other in the filling step, as illustrated in FIG. 2, are then rotated too.

This movement preferably takes place in the direction of the injection of the gases from the combustion chamber 3 so as to reduce the turbulence phenomena.

This rotation takes place in a coordinated and continuous fashion such that a curved wall of a rotary injection part 12 comes into contact with a curved wall of the other part.

Thus, by virtue of their contact, the curved walls counter the flow of the gases between the compressed gas intake 4 and the combustion chamber 3. The rotary injection parts 12 are then in a closed position, as shown in FIGS. 3 and 4.

In the same way as the rotary discharge parts 7, there is a slight clearance between the two curved walls so as to prevent the risks of impact and wear on these walls.

The injection and discharge valves are thus in the closed position. They counter respectively the flow of the gases between the compressed gas intake 4 and the combustion chamber 3, and the discharge of the gases from the combustion chamber 3, thus maintaining the combustion chamber 3 at a constant volume. The combustion step is then carried out. This step is illustrated in FIGS. 3 and 4.

Figure 9:
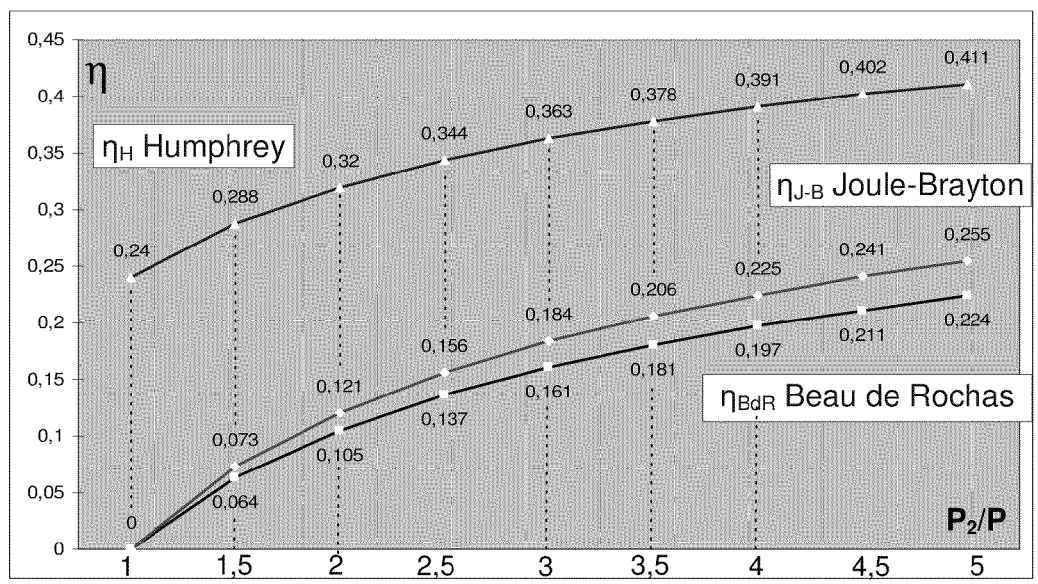
FIG. 9 is a graph of the efficiencies of the different thermodynamic cycles plotted against the intake gas compression ratio.

As illustrated in FIG. 9, the constant-volume combustion using the Humphrey cycle has a significantly better energy efficiency than constant-pressure combustion using the Joule-Brayton cycle.

In order to carry out this combustion, the combustion chamber 3 is supplied with fuel via a fuel supply 15. The mixture of compressed gas and fuel is ignited by ignition means 16.

As illustrated in FIG. 3, two ignition means 16 can be positioned in extreme positions of the combustion chamber 3, a first ignition means 16 can be actuated at a given time and then the ignition means 16 situated at the other end can be actuated in a delayed manner.

When the burnt gases 22 issuing from the first combustion expand, they compress the unburned gases, termed cool gases, and increase their pressure beyond the initial injection pressure. Once a specified pressure of the cool gases has been reached, a second ignition is triggered. The final pressure of the burnt gases will thus be greater than that reached by burnt gases issuing from compressed cool gases which have been subjected to just one ignition.

In the combustion step, the rotary discharge 7 and injection 12 parts continue their continuous rotation. In fact, the curved walls 8 of the rotary parts "roll" on each other in a fluid and impact-free manner.

Figure 5:
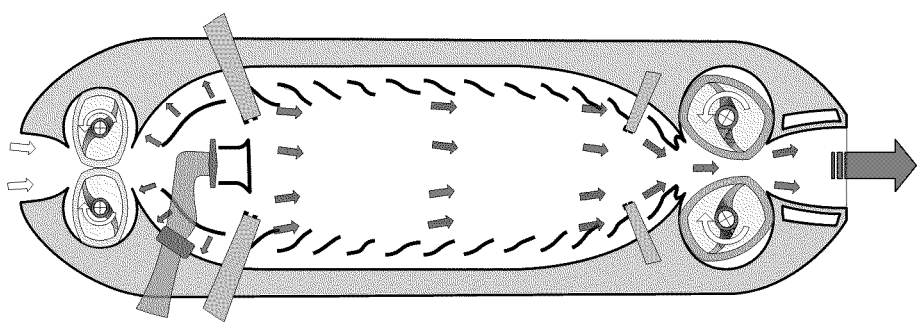
FIG. 5 is a view in section of an embodiment of the jet engine in the expansion step.

As a result of this rotation, the rotary discharge parts 7 come into the open position, as shown in FIG. 5. The gases burnt during the combustion are then discharged from the combustion chamber 3, generating a propulsive force with an intensity that is the product of the mass flow rate of the discharged burnt gases and their discharge velocity. This is the expansion step, which is illustrated in FIG. 5.

Because the intermediate walls 9 have a convex shape, when the rotary discharge parts 7 are in the open position, the space 10 through which the gases are discharged from the combustion chamber has a similar shape to that of the injector tube of a nozzle.

As shown in FIG. 5, the injection valve 11 remains in the closed position during the expansion step.

It only comes into the open position at the end of this step. The jet engine is then in the configuration of the filling step. The compressed gases expel the remaining burnt gases from the combustion chamber 3. A new filling/combustion/expansion cycle can then be performed.

Several successive filling/combustion/expansion cycles can thus be performed in sequence.

It is also possible to perform several successive filling/combustion/expansion cycles, also called combustion/expansion cycles, during which the discharge and injection valves remain in fixed open positions. The jet engine is then in the configuration of a conventional turbine engine operating continuously and with constant-pressure combustion.

It is then possible to perform combustion/expansion cycles during which the injection and discharge valves are rotating as illustrated in FIGS. 2 to 5 and as described above, and lastly to return into a configuration in which the discharge and injection valves remain in fixed open positions for several combustion/expansion cycles. The jet engine is then is a configuration with constant-volume combustion and operating in a pulsed manner.

This type of operation which alternates continuous operation (constant-pressure combustion) with pulsed operation (constant-volume combustion) is particularly advantageous in the case of an aircraft jet engine 1. Indeed, during some phases of a flight, a continuous mode of operation is sometimes preferable. This is the case in particular for take-off and landing phases, whereas a mode of operation with constant-volume combustion may be preferable in the cruising phase.

As becomes clear on examining FIG. 9, there is considerable advantage in developing a turbine engine which carries out the so-called Humphrey thermodynamic cycle which, for a compression rate $P_2/P_a$ of the cool gases, allows efficiencies η which are much higher than the Brayton cycle (conventional turbine engine), and higher still than the Beau de Rochas cycle (internal combustion engine/motor vehicle). Fuel consumption is significantly reduced.

The invention has been described above with reference to an embodiment which has been given purely by way of example. It goes without saying that it is not limited to this embodiment but extends to all the embodiments covered by the attached claims.

The invention claimed is:

1. A jet engine (1), in particular an aircraft jet engine, comprising:
   at least one enclosure (3), termed a combustion chamber, adapted to carry out combustion therein in at least one combustion step and connected to:
   at least one gas intake (4), termed a compressed gas intake, which makes it possible to supply the combustion chamber (3) with compressed gases in at least one filling step, and to
   at least one outlet (5), termed a burnt gas outlet, through which the gases are discharged from the combustion chamber in at least one expansion step,
   said burnt gas outlet(s) (5) comprising a valve (6), termed a discharge valve, wherein:
   the discharge valve (6) comprises two rotary parts (7), termed rotary discharge parts, the rotary discharge parts (7) comprising curved walls (8) and intermediate walls (9) connecting the curved walls (8) and rotating in a coordinated fashion relative to one another so as to be:
   in an angular position, termed a closed position, in which the curved wall (8) of the rotary discharge part (7) is in contact with the curved wall (8) of the other part, so as to counter a significant discharge of gas from the combustion chamber (3), in at least one combustion step, and
   in an angular position, termed an open position, in which one of the intermediate walls (9) of the rotary discharge part (7) is situated facing a wall of the other rotary discharge part (7) so as to define an open space (10) between the two walls and through which the gases are discharged from the combustion chamber (3) in at least one expansion step.

2. The jet engine as claimed in claim 1, wherein in the open position, one of the intermediate walls (9) of the rotary discharge part (7) is situated facing one of the intermediate walls (9) of the other rotary discharge part (7).

3. The jet engine as claimed in claim 2, wherein the rotary discharge parts (7) rotate directly with respect to the discharge direction of the gases from the combustion chamber (3).

4. The jet engine as claimed in claim 2 wherein the rotary discharge parts (7) are symmetrical relative to the axis of the combustion chamber (3).

5. The jet engine as claimed in claim 1, wherein the curved walls (8) of one rotary part have the same radius of curvature as the curved walls of the other rotary part.

6. The jet engine as claimed in claim 1, wherein the intermediate walls (9) of the rotary parts are convex.

7. The jet engine as claimed in claim 1, wherein the compressed gas intake (4) comprises a valve (11), termed an injection valve, which is adapted so as to counter the flow of the gases between the compressed gas intake (4) and the combustion chamber (3) in at least one combustion step.

8. The jet engine as claimed in claim 7, wherein the injection valve (11) comprises two rotary parts, termed rotary injection parts, with a structure similar to the rotary discharge parts (7), and rotating in a coordinated fashion relative to one another so as to be:
   in an angular position, termed the closed position, in which a curved wall (13) of a rotary injection part (12) is substantially in contact with a curved wall (13) of the other part, so as to counter a significant flow of the gases between the compressed gas intake and the combustion chamber (3), in at least one combustion step, and
   in an angular position, termed the open position, in which one intermediate wall (14) of the rotary injection part is situated facing an intermediate wall (14) of the other rotary injection part so as to define a space through which the compressed gases supply the combustion chamber (3), in at least one filling step.

9. The jet engine as claimed in claim 8, wherein the rotary parts of the injection valve and the discharge valve are adapted to:
   be in the fixed open position during several successive combustion/expansion steps, and then rotate in a coordinated and continuous fashion relative to one another so as to alternate several successive combustion/expansion cycles during which they are in the closed position in the combustion phase and then in an open position in the expansion phase.

10. The jet engine as claimed in claim 8 wherein the rotary parts of the injection valve and the discharge valve are adapted to:
    rotate in a coordinated and continuous fashion relative to one another so as to alternate several successive combustion/expansion cycles during which they are in the closed position in the combustion phase and then in the open position in the expansion phase, and then
    in the fixed open position during several successive combustion/expansion steps.

11. The jet engine as claimed in claim 1, wherein each combustion chamber (3) comprises:
    at least one fuel supply (15) and
    at least one ignition means (16) adapted so as to ignite a mixture of fuel and compressed gases.

12. The jet engine as claimed in claim 11, further comprising multiple ignition means (16), each situated at different distances from the compressed gas intake (4), and in that said ignition means (16) are actuated in a delayed manner.

13. The jet engine as claimed in claim 1, wherein the rotary discharge parts (7) are situated in chambers, each chamber (17) having at least one opening (18) allowing the circulation of gas between the outside of said chamber (17) and the burnt gas outlet when the rotary discharge parts (7) are in the closed position.

14. The jet engine as claimed in claim 1, wherein the rotary discharge parts (7) comprise a passage which traverses them from one side to the other and is adapted so as to permit fluid to circulate through said parts.

15. The jet engine as claimed in claim 14, wherein the fluid circulating through the rotary discharge parts (7) is compressed gas which comes from the compressed gas intake (4).

16. The jet engine as claimed in claim 1, wherein some of the thermal energy emitted by the gases issuing from the burnt gas outlet (5) is used to heat the compressed gases upstream of the combustion chamber (3).

* * * * *